(12) United States Patent  
Goodzeit

(10) Patent No.: US 7,832,688 B2
(45) Date of Patent: Nov. 16, 2010

(54) OPTIMIZED LAND MOBILE SATELLITE CONFIGURATION AND STEERING

(75) Inventor: Neil E. Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/559,246

(22) Filed: Sep. 14, 2009

(65) Prior Publication Data

US 2010/0001142 A1 Jan. 7, 2010

Related U.S. Application Data

(62) Division of application No. 11/048,760, filed on Feb. 3, 2005, now Pat. No. 7,624,948.

(60) Provisional application No. 60/633,962, filed on Dec. 7, 2004.

(51) Int. Cl.
B64G 1/42 (2006.01)
(52) U.S. Cl. .................. 244/164; 244/158.4; 701/226; 455/13.2
(58) Field of Classification Search ............ 244/158.4, 244/158.6, 164, 172.6, 172.7; 455/427, 12.1, 455/13.2, 13.3; 701/226; 342/352
See application file for complete search history.

(56) References Cited

U.S. PATENT DOCUMENTS

| | | | |
|---|---|---|---|
| 6,017,003 A | 1/2000 | Mullins | |
| 6,223,019 B1 * | 4/2001 | Briskman et al. | 455/12.1 |
| 6,283,415 B1 | 9/2001 | Rosen | |
| 6,318,676 B1 | 11/2001 | Turner et al. | |
| 6,325,332 B1 | 12/2001 | Cellier et al. | |
| 6,564,053 B1 | 5/2003 | Briskman et al. | |

(Continued)

FOREIGN PATENT DOCUMENTS

EP  1 116 657 A2  7/2001

(Continued)

OTHER PUBLICATIONS

Yoshio Karasawa, et al., "Analysis Of Availability in LMSS By Means Of Satellite Diversity Based On Three-State Propagation Channel Model", IEEE Transactions On Vehicular Technology, vol. 46, No. 4, Nov. 1997.

(Continued)

*Primary Examiner*—Benjamin P Lee
(74) *Attorney, Agent, or Firm*—McDermott Will & Emery LLP

(57) ABSTRACT

A spacecraft may include a receive antenna, a transmit antenna having an antenna attitude adjuster, and a spacecraft attitude adjustor. The spacecraft may have a nominal orientation in which a yaw axis of the spacecraft, a roll axis of the spacecraft, and the radiator panels are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$. The antenna attitude adjustor and the spacecraft attitude adjustor may correct an attitude of the transmit antenna to maintain a desired degree of the receive antenna and the transmit antenna steered toward a coverage region on Earth's surface.

9 Claims, 14 Drawing Sheets

U.S. PATENT DOCUMENTS

| | | |
|---|---|---|
| 6,616,104 B1 | 9/2003 | Cheng et al. |
| 6,695,259 B1 | 2/2004 | Maeda |
| 6,851,651 B2 | 2/2005 | Goodzeit |
| 7,277,673 B2 | 10/2007 | Castiel |
| 7,357,356 B1 | 4/2008 | Goodzeit et al. |
| 7,369,809 B1 | 5/2008 | Wang |
| 2002/0136191 A1 | 9/2002 | Draim et al. |
| 2003/0034422 A1 | 2/2003 | Higgins |
| 2003/0155468 A1 | 8/2003 | Goodzeit |
| 2003/0189136 A1 | 10/2003 | Maeda et al. |
| 2003/0228867 A1 | 12/2003 | Castiel |
| 2005/0098686 A1 | 5/2005 | Goodzeit |
| 2007/0032191 A1 | 2/2007 | Marko |

FOREIGN PATENT DOCUMENTS

| | | |
|---|---|---|
| WO | WO 03/061141 A2 | 7/2003 |

OTHER PUBLICATIONS

"S-Dars Broadcast From Inclined, Elliptical Orbits", by Robert D. Briskman, et al., 52nd International Astronautical Congress, Oct. 1-5, 2001, Toulouse, France.

* cited by examiner

COMMUNICATIONS SPACECRAFT CONFIGURATION

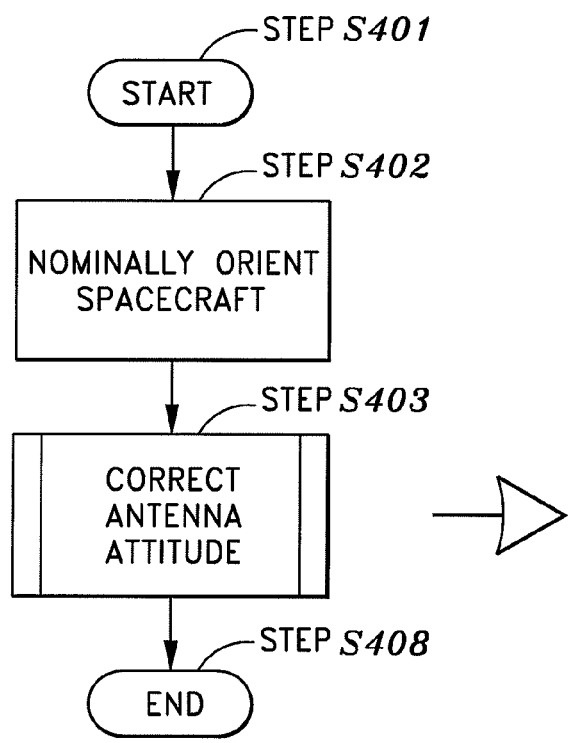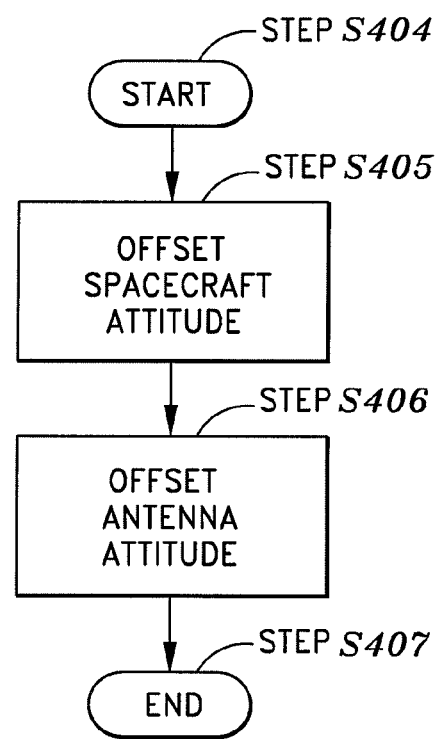
FIG. 4A
FIG. 4B

OPTIMIZED LAND MOBILE SATELLITE CONFIGURATION AND STEERING

CROSS-REFERENCE TO RELATED APPLICATIONS

This application is a divisional application of U.S. patent application Ser. No. 11/048,760, entitled "Optimized Land Mobile Satellite Configuration And Steering Method," filed Feb. 3, 2005, and issued as U.S. Pat. No. 7,624,948, which claims the benefit of priority under 35 U.S.C. §119 from U.S. Provisional Patent Application No. 60/633,962, entitled "Enhanced Orbit Designs Utilizing Improved Attitude Steering Options," filed Dec. 7, 2004, all of which are hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable

FIELD OF THE INVENTION

The present invention relates generally to optimized spacecraft configurations. In one aspect, the disclosure relates to the steering of spacecraft deployed in highly inclined orbits ("HIOs") so as to provide high performance land mobile satellite services ("LMSSs"), while maintaining a favorable sun-spacecraft geometry.

BACKGROUND OF THE INVENTION

FIG. 1 depicts a typical arrangement for a conventional geostationary earth orbit ("GEO") communications spacecraft. Normally, the yaw axis of a conventional spacecraft (such as conventional spacecraft 100) is directed at Earth's center, the yaw/roll plane is parallel to the equatorial plane, solar arrays 102 rotate about the pitch axis and orbit normal, and transponder panels 104 face in the north/south direction. Communications antennas 105 remain fixed, pointed at their Earth coverage regions.

As the angle from the sun to the spacecraft's yaw/roll plane increases, the solar radiation input to the spacecraft's heat-rejecting transponder panels increases, reducing the spacecraft's ability to reject waste heat. The increase in the sun's angle also increases the angle between the solar panels and the sun vector, thereby reducing the power produced by the solar arrays. Both of these effects potentially limit the payload that a spacecraft can carry. The typical arrangement depicted in FIG. 1 provides a conventional GEO communication spacecraft with adequate solar array power and thermal heat rejection, because it limits the angle between the sun and the spacecraft's yaw/roll plane to within the range of sun declination angles, or ±23.5°.

Despite its elegance and simplicity, a problem arises when conventional GEO spacecraft, such as spacecraft 100, are adapted to highly inclined orbits of the type presently in use to provide LMSS. For example, the SIRIUS SATELLITE RADIO® mobile satellite system provides S-band Digital Audio Radio Service ("S-DARS") using three satellites in 24-hour period repeating ground track orbits with inclination of 63.4 degrees, eccentricity of 0.27, argument of perigee of 270°, and apogee longitude of 96° west. Using the FIG. 1 spacecraft arrangement, the maximum yaw/roll plane sun angle, or the sum of the maximum sun declination and the orbit inclination, would be 87°, resulting in insufficient power and heat rejection to operate a communications payload.

To address this problem, the SIRIUS SATELLITE RADIO® mobile satellite system satellites use a sun nadir pointing ("SNP") yaw steering approach, rather than the conventional approach outlined above. See, e.g., R. Briskman et al., *S-DARS Broadcast From Inclined, Elliptical Orbits*, 52nd International Astronautical Congress, October 1 to 5, Toulouse, France. Using SNP, the yaw axis of the spacecraft remains pointed to Earth, while the spacecraft continuously rotates about the yaw axis to keep the sun vector in the spacecraft's yaw/roll plane. Although this strategy provides beneficial power and thermal conditions using a conventional GEO spacecraft, SNP requires that the spacecraft be capable of executing large-angle yaw rotations. FIG. 2, which is a chart depicting the required yaw rotation for SNP, illustrates that a 160° rotation is required for a sun beta angle of 10°.

Further to these disadvantages, SNP also restricts the antenna designs that can be utilized to specific types which can compensate for the spacecraft yaw rotation. For example, the SIRIUS SATELLITE RADIO® mobile satellite system S-band antenna utilizes a folded optics design that provides elliptically shaped coverage for North America. As the spacecraft rotates in yaw to follow the yaw steering profile, the antenna sub-reflector counter-rotates correspondingly, so that the elliptical pattern remains properly oriented over the coverage region.

This known rotating sub-reflector approach is not feasible for the next generation of the antennas envisioned for LMSS. The next-generation antennas may have large reflector surfaces (e.g., 12 meters compared to 2.5 meters for the conventional systems), which are contoured to provide a coverage pattern that closely matches the shape of the continental United States. The next generation approach will increase the signal directivity by up to 2 to 3 dB, increasing the quality of service, and increasing the probability that the signal strength will be sufficient for mobile receivers to operate.

Commonly-assigned U.S. Pat. No. 6,616,104 ("the Cheng patent") describes an improved arrangement for a spacecraft which remedies some of the deficiencies of other conventional spacecraft. The Cheng patent describes a system which utilizes body steering only, fixing the antenna boresight in the spacecraft body frame, with a roll angle equal to the orbit inclination. With a fixed antenna boresight, the arrangement described in the Cheng patent is generally limited to spacecraft which operate in a narrow region about orbit apogee, such as spacecraft which operate over a limited range of latitudes and only 8 hours of a 24-hour orbit period.

Due to their substantial build, launch and operational costs, it is considered highly desirable to overcome the deficiencies of conventional LMSS spacecraft configurations and attitude steering methods. Specifically, it is desirable to provide an enhanced land mobile satellite configuration and steering method which provides a favorable sun-spacecraft geometry compatible with current and future payload power and thermal requirements, without the need for yaw steering.

SUMMARY OF THE INVENTION

In one aspect of the disclosure, the present invention relates generally to spacecraft configurations and steering and, more particularly, relates to the steering of spacecraft deployed in HIOs so as to provide high performance LMSSs, while maintaining a favorable sun-spacecraft geometry.

The optimized land mobile satellite configuration and steering method according to one aspect of the disclosure addresses the limitations of conventional systems by providing a spacecraft configuration, and an attitude and antenna steering approach that provides higher performance LMSS. Specifically, in one aspect of the disclosure, the enhanced spacecraft configuration and steering method provides sun-spacecraft geometry compatible with payload power and thermal requirements, without the need for yaw steering, and also provides compatibility with next-generation high-directivity LMSS transmit antenna designs.

According to one arrangement, a method may provide for configuring and operating a spacecraft in an orbit that is inclined with respect to Earth's equatorial plane, the spacecraft including at least a solar array, a receive antenna, a transmit antenna, and radiator panels. The method includes the step of nominally orienting the yaw axis of the spacecraft, the roll axis of the spacecraft, and the radiator panels substantially parallel to Earth's equatorial plane, the pitch axis of the spacecraft and rotation axis of the solar array substantially parallel to Earth's polar axis, the Nadir vector in the yaw-pitch plane of the spacecraft, and the transmit antenna and receive antenna to angle $\phi_{nom}$. The method also includes the step of correcting the attitude of the receive antenna and the transmit antenna to maintain a desired degree of the receive antenna and the transmit antenna steered toward a coverage region on Earth's surface. The correcting step further includes the steps of offsetting the attitude of the spacecraft by angle θ with respect to the pitch axis of the nominal orientation, and by angle $\phi_b$ with respect to the roll axis of the spacecraft, and offsetting the receive antenna and the transmit antenna at angle $\phi_a$ with respect to the spacecraft.

According to a second arrangement, a spacecraft may be operable in an inclined orbit with respect to Earth's equator. The spacecraft may include at least one solar array rotatable about a pitch axis of the spacecraft, a receive antenna, and a transmit antenna including an antenna attitude adjuster. The spacecraft may also include at least one radiator panel, and a spacecraft attitude adjustor. The spacecraft is configured such that the spacecraft has a nominal orientation in which a yaw axis of the spacecraft, a roll axis of the spacecraft, and the radiator panels are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$. The antenna attitude adjustor and the spacecraft attitude adjustor may be configured to correct an attitude of the transmit antenna to maintain a desired degree of the receive antenna and the transmit antenna steered toward a coverage region on Earth's surface, by offsetting an attitude of the spacecraft by angle θ with respect to a pitch axis of the nominal orientation and by angle $\phi_b$ with respect to the roll axis of the spacecraft, and by offsetting the receive antenna and the transmit antenna at a roll angle $\phi_a$ with respect to the spacecraft. In one aspect, a roll rotation angle $\phi$ is a combination of the angle $\phi_b$ and the roll angle $\phi_a$.

In one aspect, angle $\phi_{nom}$ is based upon orbit parameters, orbital region of broadcast service, and/or the coverage region. Offset angles may be determined based upon maximum allowable sun angle, or roll offset from the nominal orientation. The coverage region may be North America, although in alternate embodiments of the present invention the coverage region is another region aside from North America.

In contrast to conventional designs, the optimized spacecraft configuration and steering method according to one aspect of the disclosure applies to spacecraft that may operate for extended periods over a wide range of latitudes, such as 16 of 24 hours, and over the entire Northern hemisphere, as required for the SIRIUS SATELLITE RADIO® mobile satellite system. The approach used by an embodiment of the present invention partitions the steering to both the spacecraft and the antenna to provide improved sun geometry for power generation and thermal control. In doing so, an embodiment of the present invention represents a significant improvement over the conventional methods.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIGS. 4A and 4B illustrate a method for configuring and operating a spacecraft in an orbit which is inclined with respect to Earth's equatorial plane;

DETAILED DESCRIPTION OF THE INVENTION

An embodiment of the present invention provides an LMSS for North American coverage, which overcomes the deficiencies of conventional MSS systems. Specifically, an embodiment of the present invention provides an enhanced LMSS using an optimized land mobile satellite configuration and steering method, which provides a favorable sun-spacecraft geometry compatible with current and future payload power and thermal requirements, without the need for yaw steering.

Figure 3:
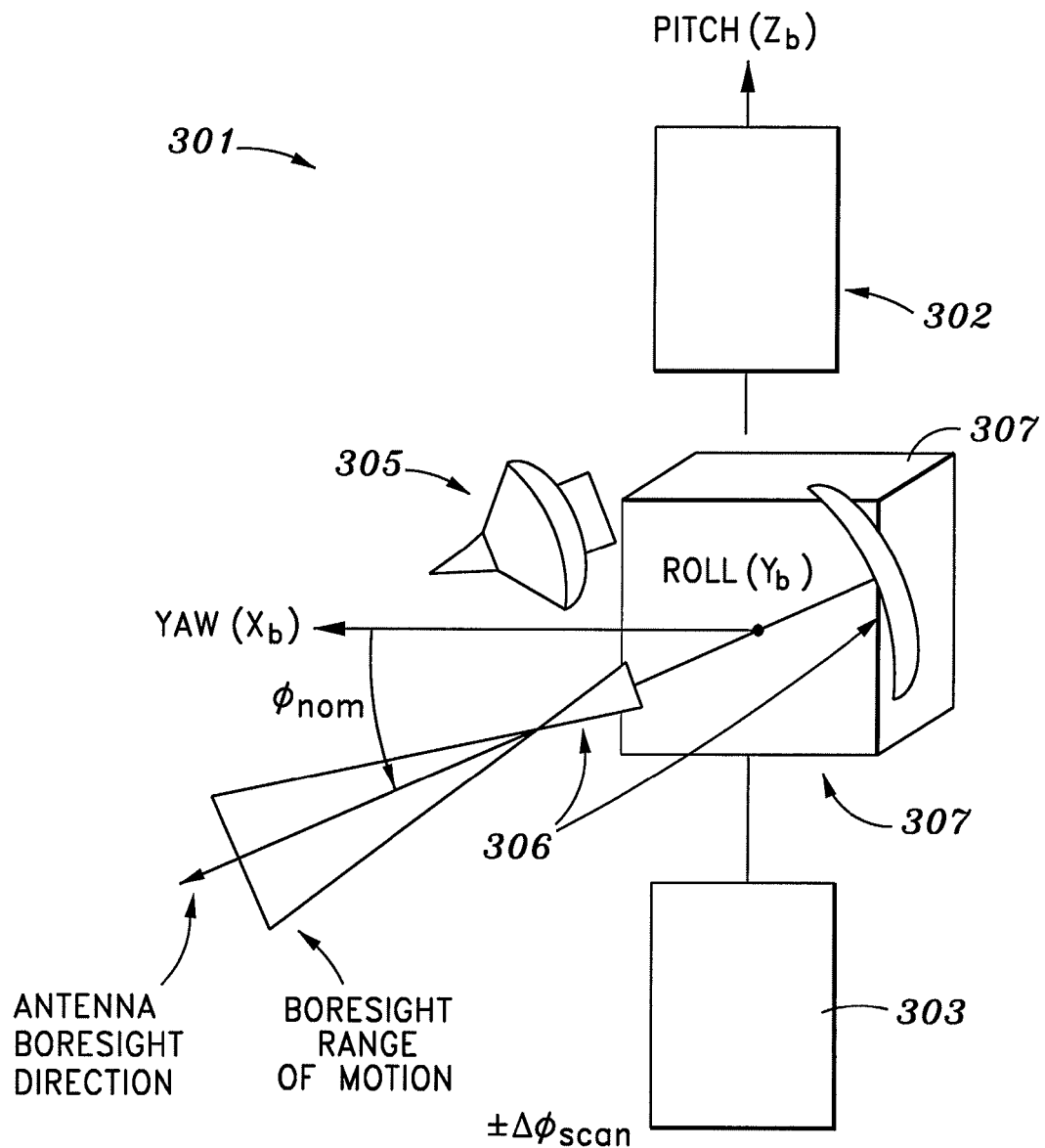
FIG. 3 is a diagram depicting the optimized spacecraft configuration according to one embodiment of the present invention.

FIG. 3 is a diagram depicting the optimized spacecraft configuration according to one embodiment of the present invention. Briefly, an aspect of the present disclosure provides a method for configuring and operating a spacecraft in an orbit that is inclined with respect to Earth's equatorial plane, the spacecraft including at least a solar array, a receive antenna, a transmit antenna, and radiator panels. The method includes the step of nominally orienting the yaw axis of the spacecraft, the roll axis of the spacecraft, and the radiator panels substantially parallel to Earth's equatorial plane, the pitch axis of the spacecraft and rotation axis of the solar array substantially parallel to Earth's polar axis, the Nadir vector in the yaw-pitch plane of the spacecraft, and the transmit antenna and receive antenna to angle $\phi_{nom}$. The method also includes the step of correcting the attitude of the receive antenna and the transmit antenna to maintain a desired degree of the receive antenna and the transmit antenna steered toward a coverage region on Earth's surface. The correcting step further includes the steps of offsetting the attitude of the spacecraft by angle $\theta$ with respect to the pitch axis of the nominal orientation, and by angle $\phi_b$ with respect to the roll axis of the spacecraft, and offsetting the receive antenna and the transmit antenna at angle $\phi_a$ with respect to the spacecraft.

In more detail, spacecraft 301 includes solar arrays 302 and 303, receive antenna 305, transmit antenna 306, and radiator panels 307. Inherent to spacecraft 301 are yaw axis $X_b$, roll axis $Y_b$, pitch axis $Z_b$, and Nadir vector N (not shown).

FIGS. 4A and 4B are a flow charts illustrating the method for configuring and operating spacecraft 301 in an orbit which is inclined with respect to Earth's equatorial plane. As depicted in FIG. 4A, the process begins (step S401), and yaw axis $X_b$ of spacecraft 301, roll axis $Y_b$ of spacecraft 301, and radiator panels 307 are nominally oriented substantially parallel to Earth's equatorial plane, and pitch axis $Z_b$ of spacecraft 301 and the rotation axis of solar arrays 302 and 303 are nominally oriented substantially parallel to Earth's polar axis (step S402). Additionally, the Nadir vector N is oriented in the yaw-pitch plane of spacecraft 301, and transmit antenna 306 and receive antenna 307 are oriented to angle $\phi_{nom}$ (step S402).

The attitude of receive antenna 305 and transmit antenna 306 are corrected to maintain a desired degree of receive antenna 305 and transmit antenna 306 steered toward a coverage region on Earth's surface (step S403), and the process ends (step S408).

As shown in FIG. 4B, the correcting step (step S403) begins at sub-step S404, and further includes the sub-steps of offsetting the attitude of spacecraft 301 by angle $\theta$ with respect to the pitch axis of the nominal orientation, and by angle $\phi_b$ with respect to the roll axis of the spacecraft, (sub-step S405), and offsetting receive antenna 305 and transmit antenna 306 at angle $\phi_a$ with respect to the spacecraft (sub-step S406). Sub-step S407 ends correcting step S403.

Offset angles are determined based upon maximum allowable sun angle, or roll offset from the nominal orientation. The coverage region is North America, although in alternate aspects of the present invention, the coverage region includes areas outside of North America.

In contrast to conventional designs, the optimized spacecraft configuration and steering method according to an aspect of the present disclosure applies to spacecraft that may operate for extended periods over a wide range of latitudes, such as 16 of 24 hours, and over the entire Northern hemisphere, as required for the SIRIUS SATELLITE RADIO® mobile satellite system. The approach used by an embodiment of the present invention partitions the steering to both the spacecraft and the antenna to provide improved sun geometry for power generation and thermal control. In doing so, an embodiment of the present invention represents a significant improvement over the conventional methods.

As shown in FIG. 3, spacecraft 301 includes both receive antenna 305 and transmit antenna 306 that are oriented with their boresights canted at a specified angle $\phi_{nom}$ about the body roll ($Y_b$) axis. The antenna design facilitates a roll rotation $\Delta\phi_{scan}$ over a specified range about the nominal roll offset. The nominal angle $\phi_{nom}$ is selected based on the orbit parameters, the orbital region of broadcast service, and the coverage region to which service is to be provided.

Figure 5:
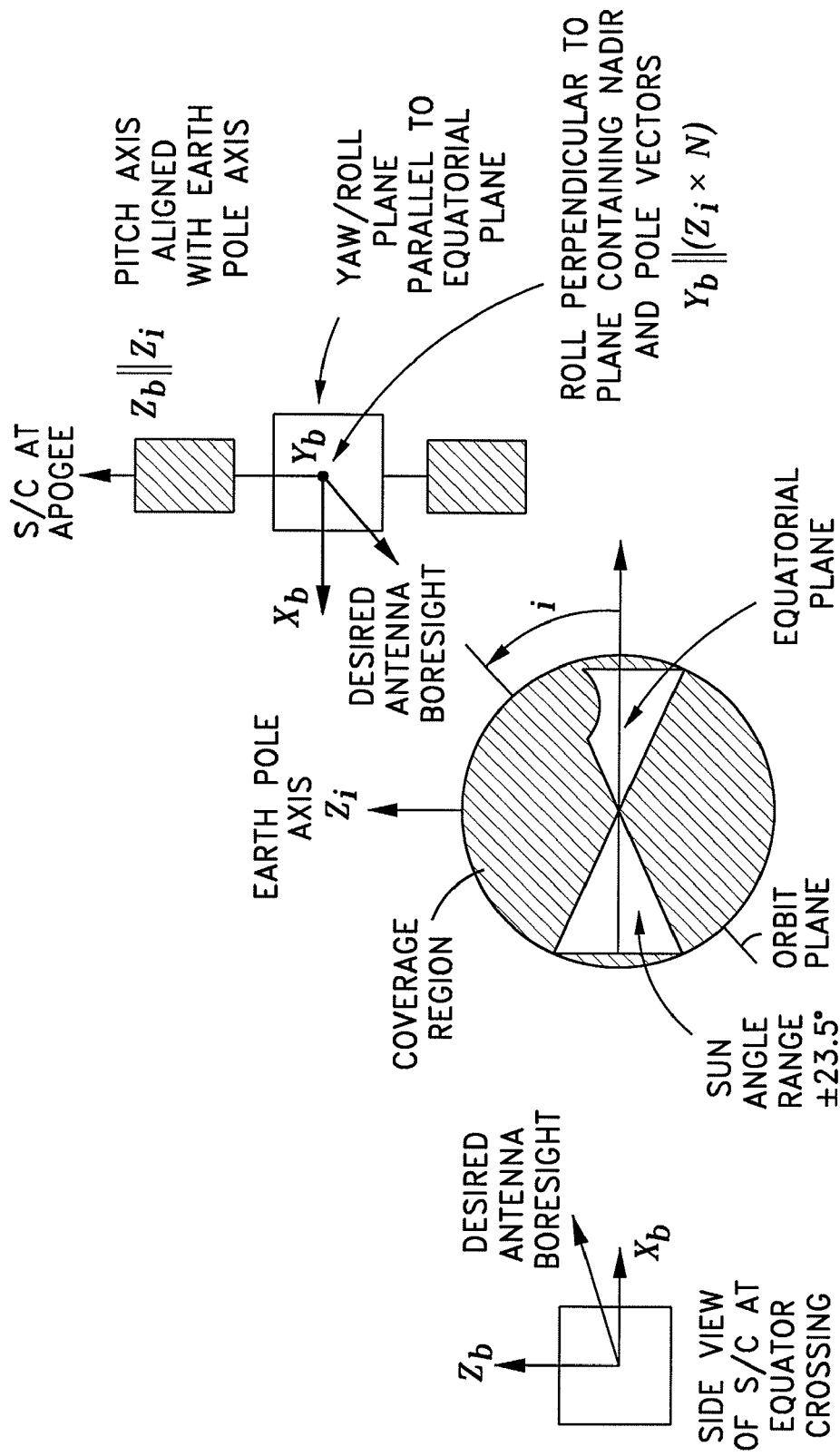
FIG. 5 illustrates attitude steering according to one embodiment of the present invention, showing the spacecraft in-orbit geometry in a typical highly inclined orbit where LMSS is provided to a coverage region in the Northern hemisphere.

FIG. 5 further illustrates attitude steering according to one aspect of the present invention, showing the spacecraft in-orbit geometry in a typical highly inclined orbit where LMSS is provided to a coverage region in the Northern hemisphere. As shown in FIG. 5, to provide antenna pointing to the coverage region, the antenna boresight tracks a commanded attitude represented by the 3×3 transformation matrix expressed below in Equation (1):

$$T_c = T_\phi T_\theta T_{ENP} \quad (1)$$

In Equation (1), $T_\phi$ is the roll correction matrix, $T_\theta$ is the pitch correction matrix, and $T_{ENP}$ is the Equatorial Nadir Pointing ("ENP") matrix. Antenna pointing is accomplished by a combination of spacecraft body steering and antenna boresight steering, as described more fully below.

The matrix $T_{ENP}$ describes the nominal spacecraft body pointing direction in inertial space in the absence of additional body pointing corrections, and is expressed below in Equation (2):

$$T_{ENP} = [X_i Y_i Z_i] \quad (2)$$

In Equation (2), $Z_i$ is the inertial frame earth pole axis vector, and vectors $X_i$ and $Y_i$ are expressed by Equation (3), below:

$$Y_i = \frac{Z_i \times N}{\|Z_i \times N\|} \quad (3)$$
$$X_i = \frac{Y_i \times Z_i}{\|Y_i \times Z_i\|}$$

In Equation (3), N is the inertial frame spacecraft Nadir vector. Aligning the body frame with the inertial attitude represented by $T_{ENP}$ causes the spacecraft yaw/roll plane to remain parallel to Earth equatorial plane and the spacecraft pitch axis to remain aligned with Earth pole axis. The Nadir vector remains in the spacecraft yaw/pitch plane, and when the spacecraft crosses the equator, the Nadir vector is aligned with the spacecraft yaw axis. As can be seen from FIG. 5, the ENP pointing strategy results in sun angles within ±23.5°, which are compatible with existing GEO spacecraft designs.

Starting from the ENP attitude, as the spacecraft orbital position changes, antenna pointing is accomplished by commanding the spacecraft body and antenna pointing offsets represented by the matrices of Equation (4):

$$T_\phi = \begin{bmatrix} \cos\phi & 0 & -\sin\phi \\ 0 & 1 & 0 \\ \sin\phi & & \cos\phi \end{bmatrix} \quad (4)$$

$$T_\theta = \begin{bmatrix} \cos\theta & \sin\theta & 0 \\ -\sin\theta & \cos\theta & 0 \\ 0 & 0 & 1 \end{bmatrix}$$

In Equation (4), pitch and roll angles θ, φ are as expressed below in Equation (5):

$$\theta = \tan^{-1}\left(\frac{Y_i \cdot V_t}{X_i \cdot V_t}\right)$$

$$\phi = -\sin^{-1}(Z_i \cdot V_t)$$

(5)

In Equation (5), $V_t$ is a unit vector from the spacecraft to a specified location on Earth's surface in the coverage region, such that the antenna remains correctly pointed. $V_t$, for example, could be the sub-satellite point when the spacecraft is at orbit apogee. The pitch correction is generally implemented as a spacecraft body rotation from the ENP attitude, and does not impact the sun angles from the spacecraft yaw/roll plane. The roll rotation is generally implemented as a combination of body and antenna pointing corrections, as expressed in Equation (6):

$$\phi = \phi_b + \phi_a \quad (6)$$

The body and antenna roll corrections $\phi_b$ and $\phi_a$ may be determined in any number of ways, depending on the maximum allowable antenna roll scan angle range or the allowable sun angles from the spacecraft yaw/roll plane. One method for partitioning the offsets based on the maximum antenna scan angle $\Delta\phi_{scan}$ is $$\phi_a = c(\phi - \phi_{nom}) + \phi_{nom} \; \phi_b = (1-c)(\phi - \phi_{nom}) \quad (7)$$

In Equation (7), c and $\phi_{nom}$ are expressed as shown below in Equation (8):

$$c = \frac{\Delta\phi_{scan}}{\Delta\phi}$$

$$\Delta\phi = \frac{\phi_{max} - \phi_{min}}{2}$$

$$\phi_{nom} = \frac{\phi_{max} + \phi_{min}}{2}$$

(8)

In Equations (7) and (8), $\phi_{nom}$ is the nominal antenna roll offset in the spacecraft body frame, and $\Delta\phi$ is the roll angle excursion required about the nominal offset, i.e., $\phi_{nom} - \Delta\phi \leq \phi_a \leq \phi_{nom} + \Delta\phi$. These quantities are computed based on $\phi_{max}$ and $\phi_{min}$, which are the maximum and minimum roll offsets required from the ENP frame over the broadcast service region of the orbit (e.g., the Northern hemisphere).

Using the pointing strategy outlined above, the maximum spacecraft body roll offset is $(1-c)\Delta\phi$, and the maximum sun angle from the spacecraft yaw/roll plane is the sum of this angle and the sun declination of 23.5°. Alternate methods for partitioning the antenna and body roll pointing offsets are also contemplated by the present invention, such as partitioning based on the maximum allowable sun angle or roll offset from the ENP frame.

Examples of the steering profiles are now given for the orbits given in Table 1, which includes the Sirius Satellite Radio orbit disclosed in U.S. Pat. No. 6,564,053 ("the Briskman patent"). Several other optimized orbits which are selected to provide enhanced elevation angles and probability of signal availability for LMSS, denoted as "Option 1," "Option 2," and "Option 3", are also listed.

The optimized orbits listed in Table 1 have substantially teardrop-shaped or oval-shaped ground tracks, and are optimized based upon performance criteria. A full explanation of the methodology and performance criteria used to select the optimized orbits is available in U.S. patent application Ser. No. 11/030,282, entitled "Optimized Land Mobile Satellite System For North American Coverage," filed Jan. 7, 2005 ("the Goodzeit '282 application"). Both the Briskman patent and the Goodzeit '282 application are incorporated by reference herein in the entirety for all purposes, although further details relating to the content of both references are omitted for the sake of brevity.

TABLE 1

Orbits for North American LMSS

| Parameter | SIRIUS Orbit | Option 1 | Option 2 | Option 3 |
|---|---|---|---|---|
| Inclination | 63.4 | 48.2 | 45.4 | 58.9 |
| Eccentricity | 0.27 | 0.24 | 0.40 | 0.35 |
| Apogee longitude (°W) | 96 | 95 | 95 | 95 |
| Antenna roll offset (°) $\phi_{nom}$ | 27.5 | 19.2 | 25.5 | 28.7 |
| Roll angle variation about nominal (°) $\Delta\phi$ | 35.9 | 29.0 | 19.8 | 30.2 |
| Maximum body roll offset (°) | 20.9 | 14.0 | 4.8 | 15.2 |
| Maximum pitch angle (°) | 2.2 | 3.2 | 4.8 | 3.0 |

All of the orbits listed in Table 1 have a semi-major axis of 42,164 km and an argument of perigee of 270°. Also provided in Table 1 are the nominal antenna roll offset, the roll angle variation about the nominal offset, and the maximum body roll offset, based on Equations (7) and (8). The results of these equations assume an antenna roll scan angle range of ±15°, where the spacecraft operates for ±8 hours about orbit apogee, and where the vector $V_t$ in Equation (5) is from the spacecraft to the sub-satellite point at orbit apogee. Table 1 also provides the maximum pitch angle, which is computed using Equation (5).

Figure 6A:
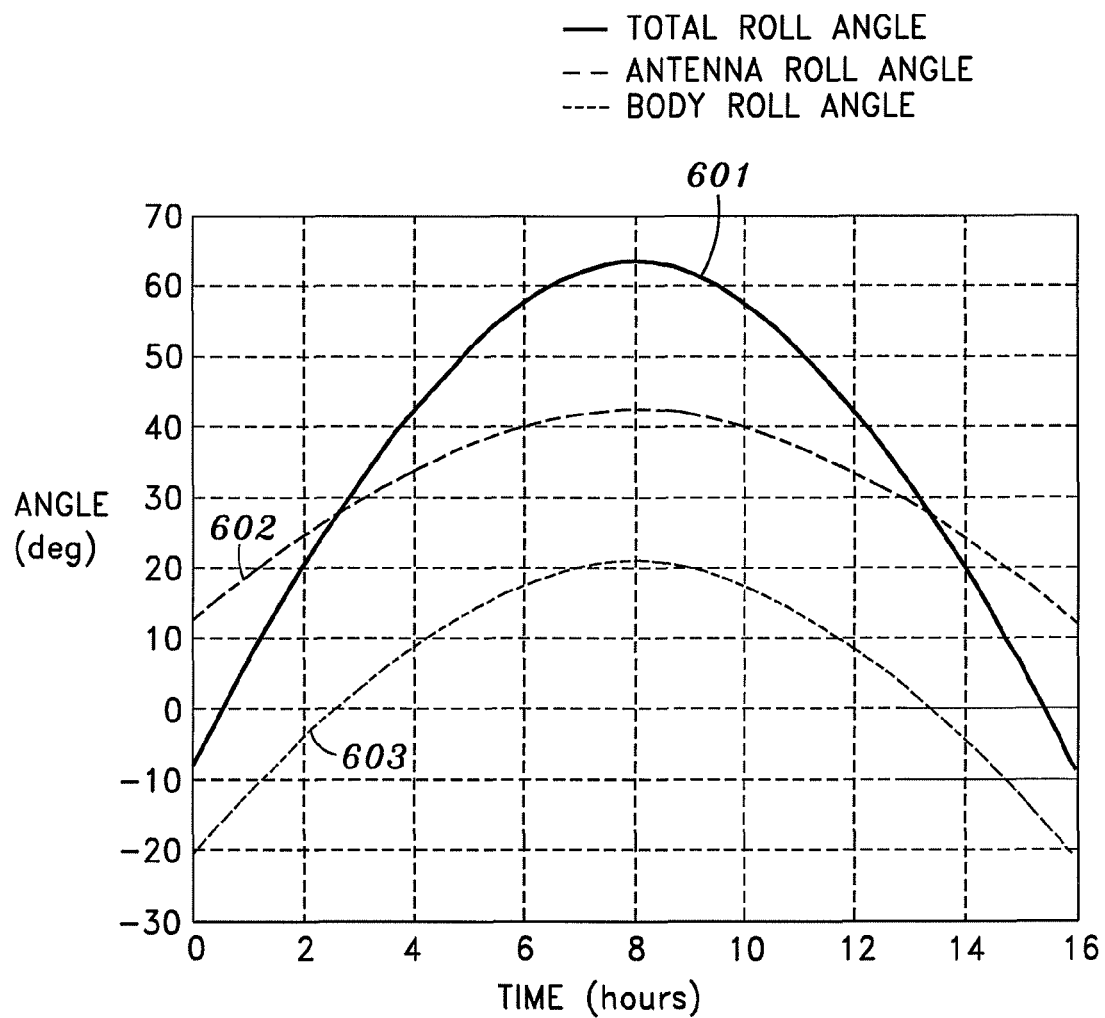
FIGS. 6A and 6B depict the total roll offset, the antenna roll offset, the body roll offset, and the body pitch offset for a conventional orbit.
Figure 6B:
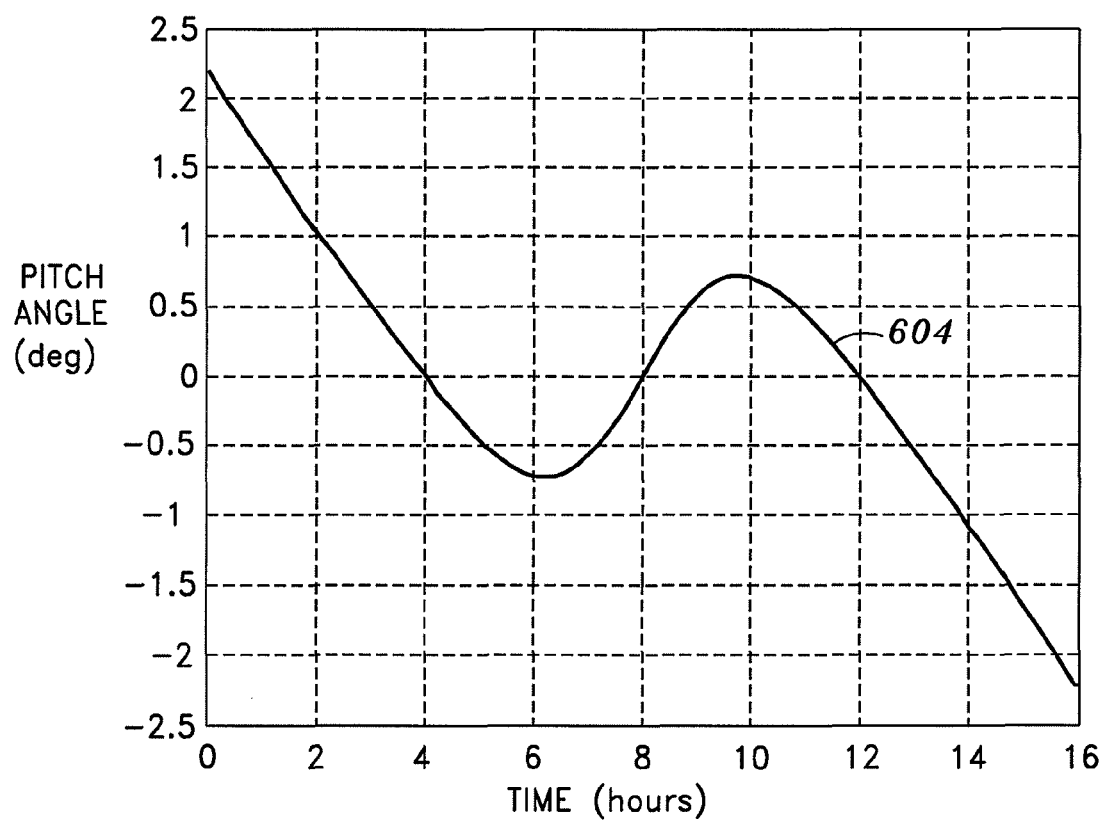

FIG. 6A is a chart depicting the total roll offset (denoted by reference 601), the antenna roll offset (denoted by reference 602), and the body roll offset (denoted by reference 603) for the orbit described in the Briskman patent, and FIG. 6B is a chart depicting the body pitch offset (denoted by reference 604) for the same orbit.

Figure 7A:
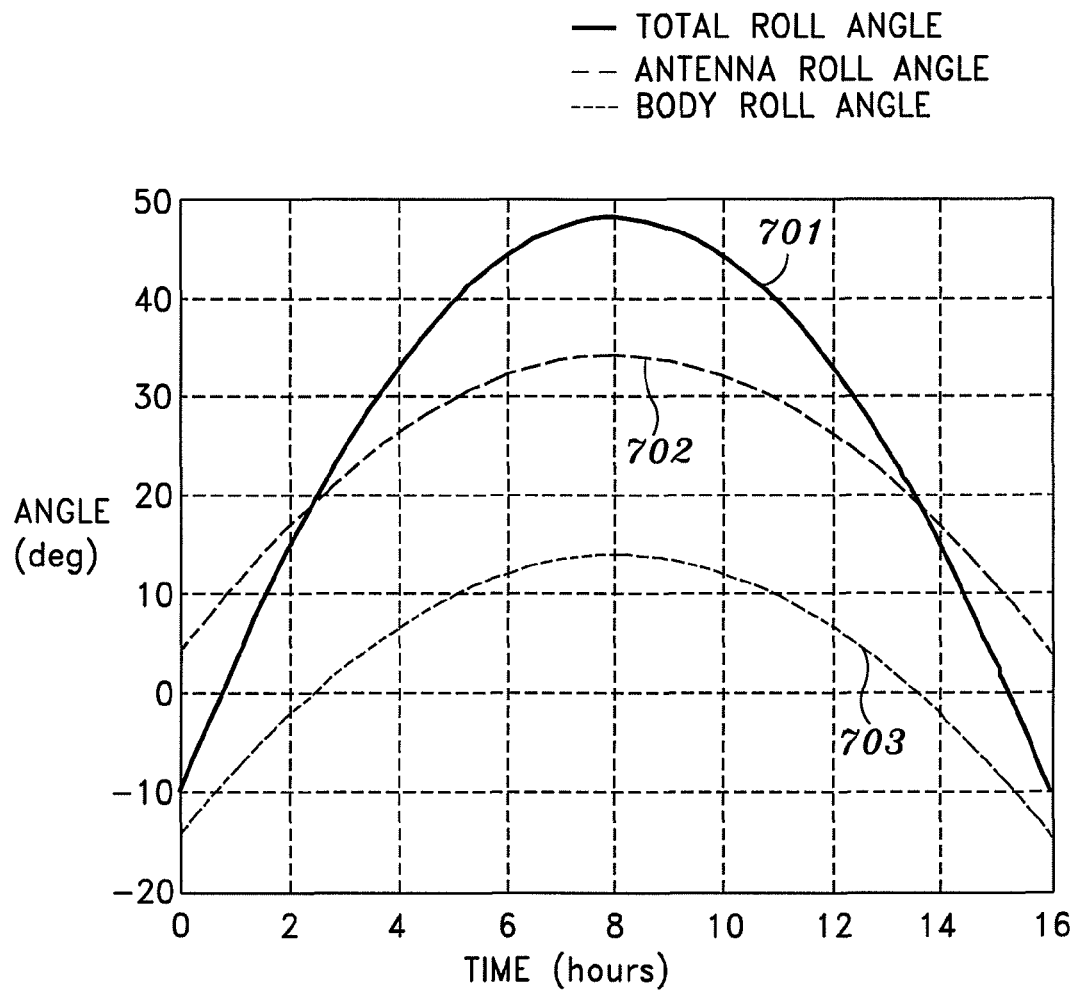
FIGS. 7A and 7B depict the total roll offset, the antenna roll offset, the body roll offset, and the body pitch offset for an "Option 1" orbit.
Figure 7B:
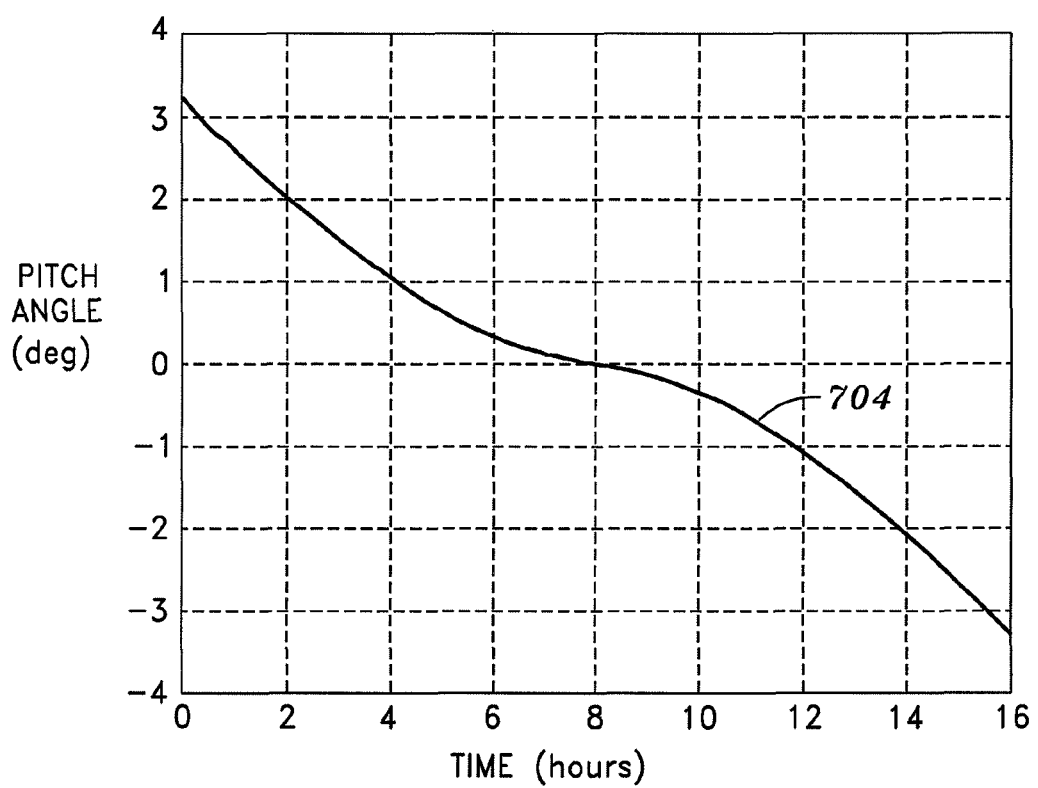

FIG. 7A is a chart depicting the total roll offset (denoted by reference 701), the antenna roll offset (denoted by reference 702), and the body roll offset (denoted by reference 703) for the Option 1 orbit, and FIG. 7B is a chart depicting the body pitch offset (denoted by reference 704) for the same orbit.

Figure 8A:
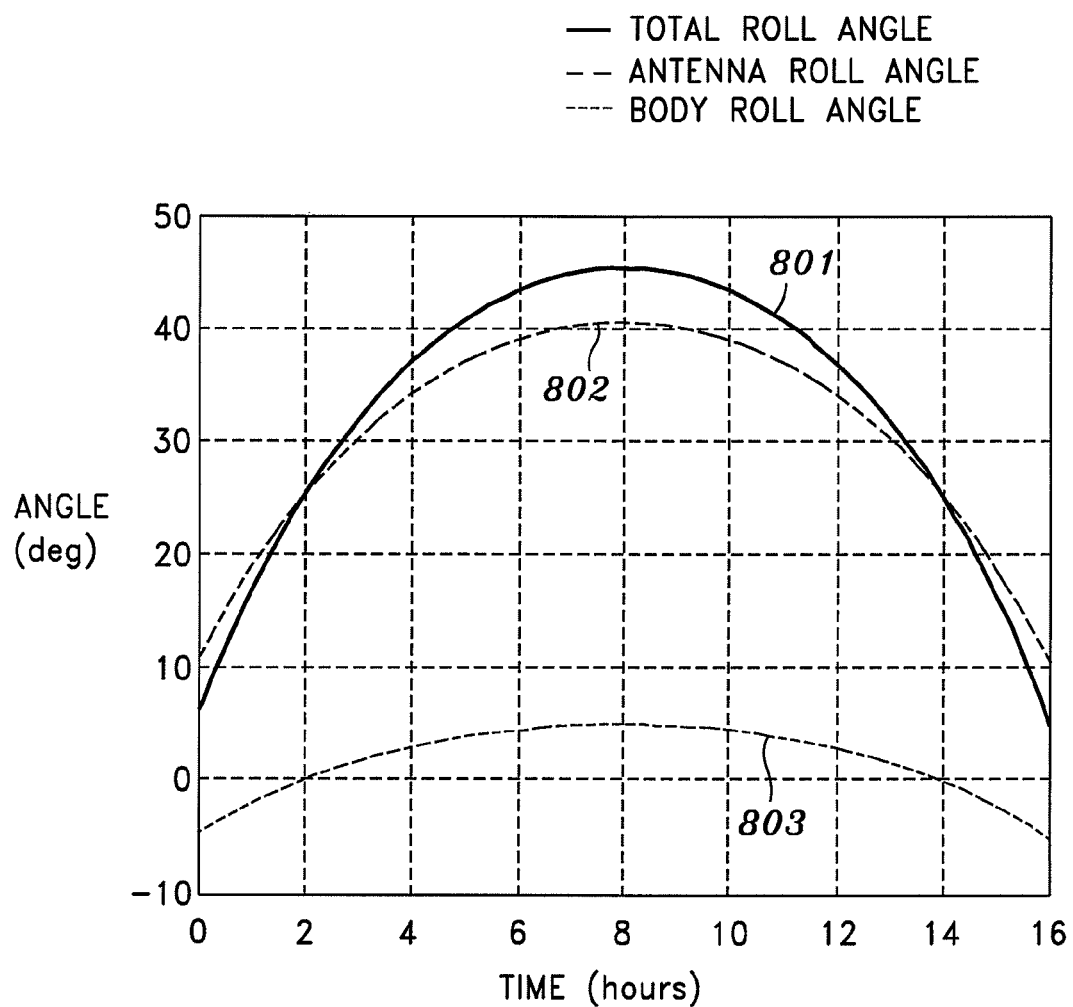
FIGS. 8A and 8B depict the total roll offset, the antenna roll offset, the body roll offset, and the body pitch offset for an "Option 2" orbit.
Figure 8B:
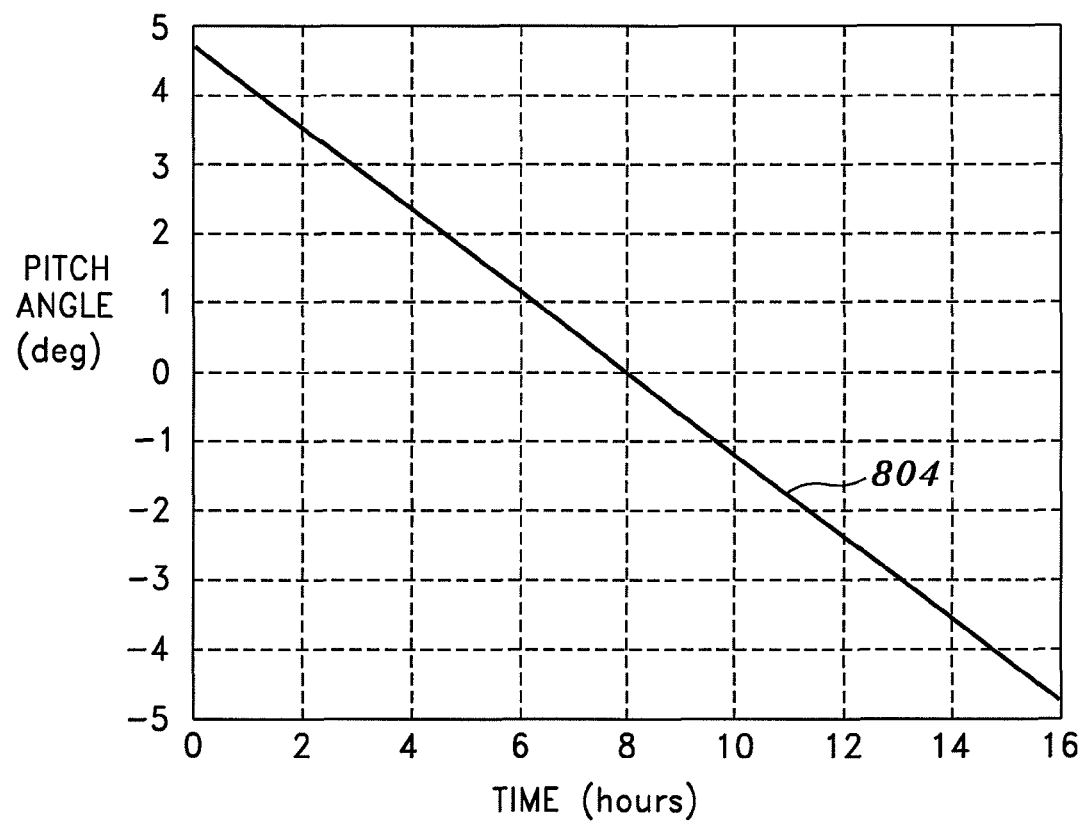

FIG. 8A is a chart depicting the total roll offset (denoted by reference 801), the antenna roll offset (denoted by reference 802), and the body roll offset (denoted by reference 803) for the Option 2 orbit, and FIG. 8B is a chart depicting the body pitch offset (denoted by reference 804) for the same orbit.

Figure 9A:
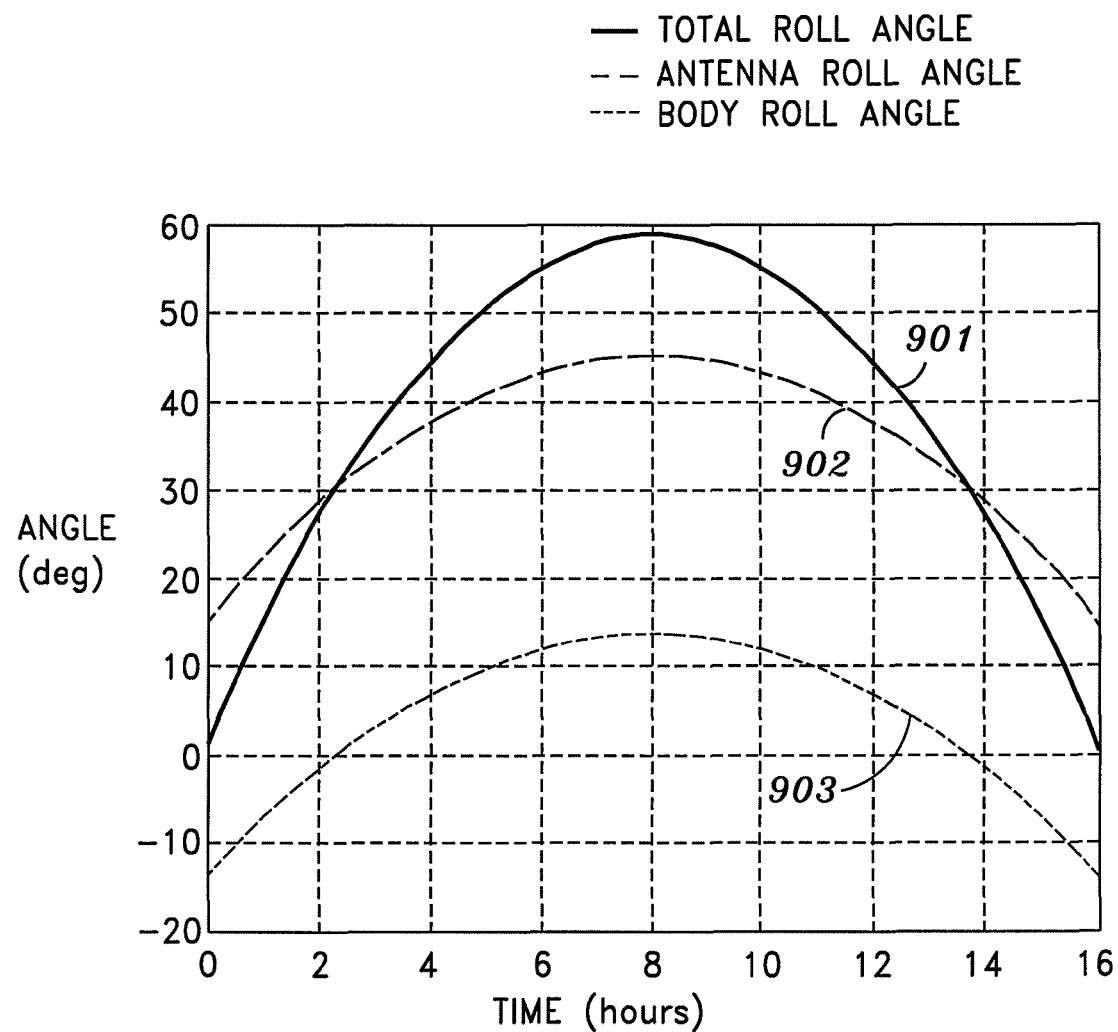
FIGS. 9A and 9B depict the total roll offset, the antenna roll offset, the body roll offset, and the body pitch offset for an "Option 3" orbit.
Figure 9B:
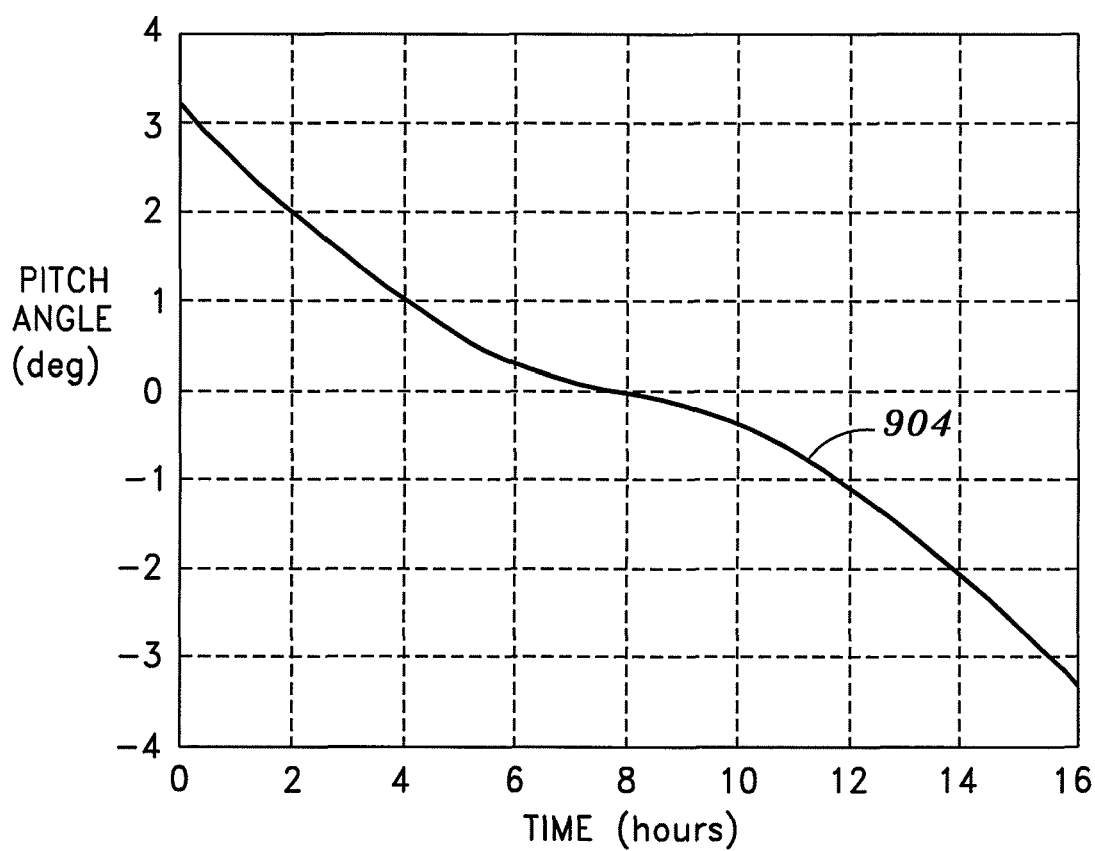

FIG. 9A is a chart depicting the total roll offset (denoted by reference 901), the antenna roll offset (denoted by reference 902), and the body roll offset (denoted by reference 903) for the Option 3 orbit, and FIG. 9B is a chart depicting the body pitch offset (denoted by reference 904) for the same orbit.

Figure 1:
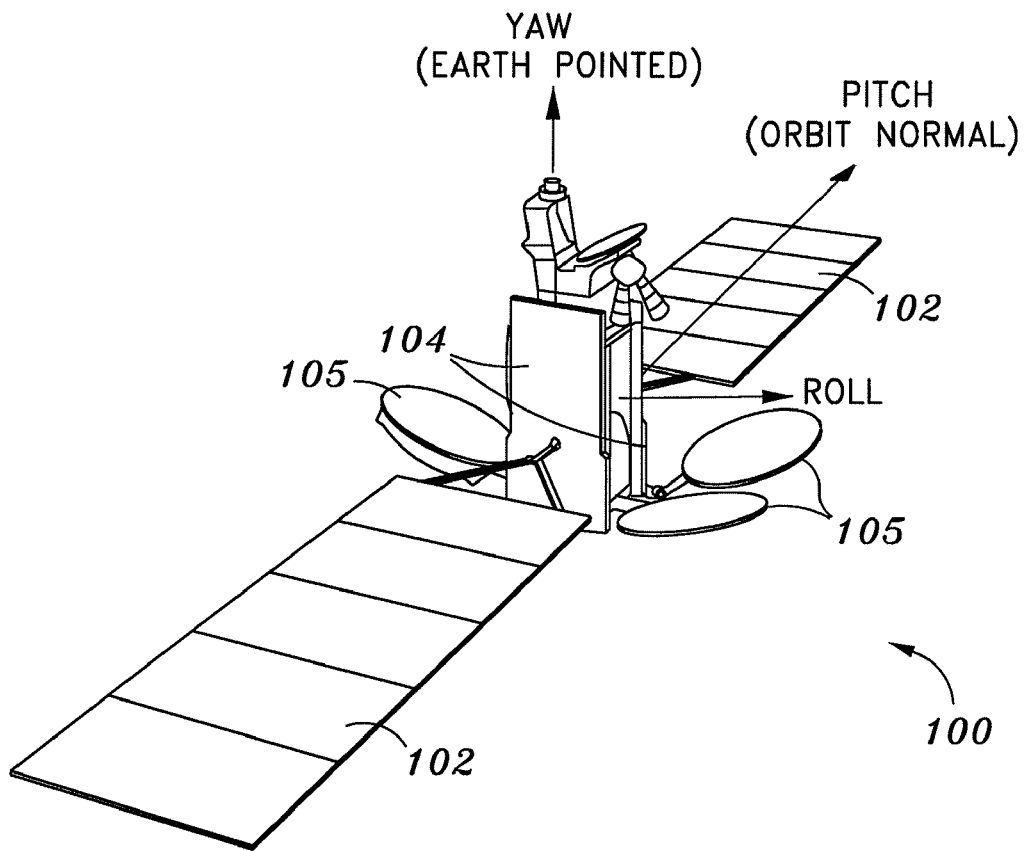
FIG. 1 depicts a typical arrangement for a conventional geostationary earth orbit ("GEO") communications spacecraft.
Figure 2:
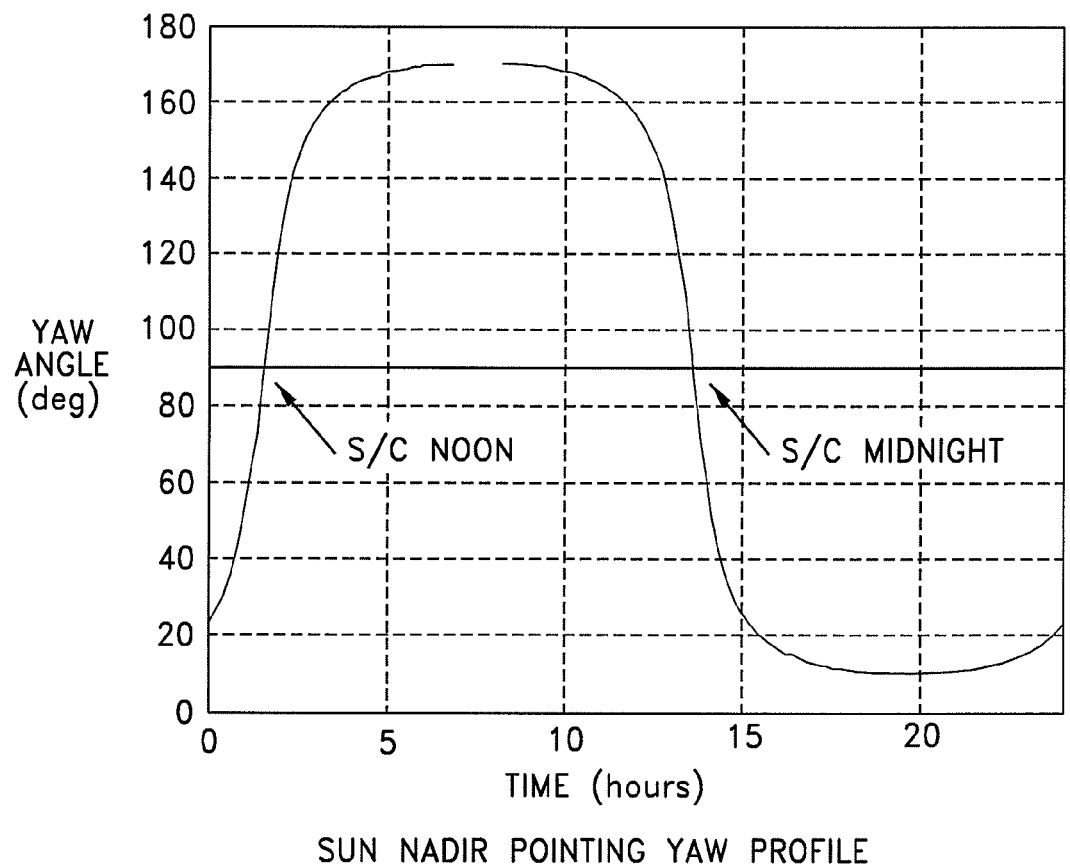
FIG. 2 depicts the required yaw rotation for SNP.

As can be seen from Table 1 and FIGS. 6A to 9B, the maximum required roll and pitch offsets of 20.9° and 4.8° necessary to implement the steering approach according to an aspect of the present disclosure are far smaller than the yaw offsets required to implement a conventional SNP steering approach, which is shown in FIG. 2. The reduced spacecraft maneuvering requirements improve attitude pointing performance and allow the use of smaller and lighter reaction wheels assemblies ("RWAs"). Also, it should be noted that the optimized orbits result in a smaller body roll offsets than the conventional orbit, thereby reducing the sun angle from the yaw/roll plane and improving spacecraft power and thermal performance.

Figure 10:
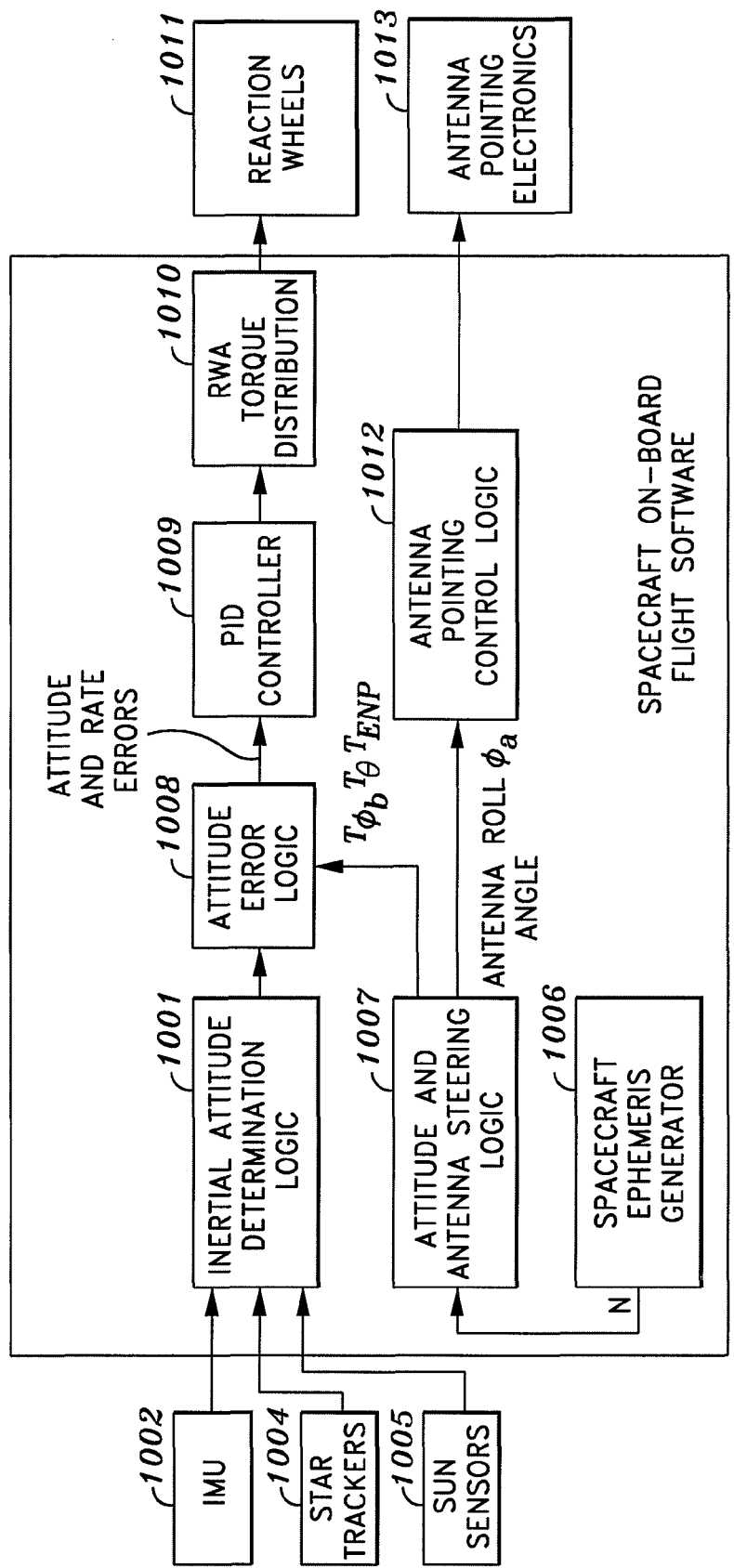
FIG. 10 is a block diagram of a system that implements the attitude and antenna steering approach according to one embodiment of the present invention.

FIG. 10 is a block diagram of a system that implements the attitude and antenna steering approach according to an aspect of the present invention. Inertial Attitude Determination Logic 1001 computes the spacecraft inertial attitude using gyro angular rate data from Inertial Measurement Unit ("IMU") 1002, and attitude data from star trackers 1004 and sun sensors 1005. Those skilled in the art will recognize that other combinations of attitude sensors may be used for attitude determination including earth sensors and other sun sensors.

Spacecraft Ephemeris Generator 1006 computes the spacecraft orbital position and velocity and provides an estimate of the Nadir vector N, the vector from the spacecraft to Earth's center. Using this vector, the Attitude And Antenna Steering Logic 1007 computes the commanded spacecraft inertial-to-body frame transformation and commanded antenna roll angle according to the steps described above in Equations (1) to (8).

As described in Equation (6), a portion of the roll pointing command is allocated to the antenna and a portion is allocated to the spacecraft body. In consideration of this partitioning, Equation (1) can also be expressed as Equation (9):

$$T_c = T_{\phi_a} T_{\phi_b} T_\theta T_{ENP} \quad (9)$$

The spacecraft body portion of the commanded attitude $T_{74_b} T_{74} T_{ENP}$ shown in FIG. 9, is input to the Attitude Error Logic 1008, which computes the attitude pointing and rate errors representative of the error between the present spacecraft attitude and the commanded inertial attitude. The attitude and rate errors are input to a Proportional-Integral-Derivative ("PID") controller 1009 that computes torque commands for attitude control. The torque commands are then input to RWA Torque Distribution Logic 1010 that commands individual RWAs 1011 to produce control torque that causes the spacecraft to track the commanded attitude.

The antenna roll pointing correction represented by $T_{\phi_c}$ or $\phi_a$ is input to the Antenna Pointing Control Logic 1012. This logic commands the Antenna Pointing Electronics 1013 to achieve the commanded antenna boresight roll pointing. The antenna pointing is controlled either mechanically or electrically, depending on the antenna design. For example, the antenna may include a gimbaled reflector that may be rotated to change the antenna boresight pointing. Alternatively, the antenna may be a phased array antenna design, such that the phases of the individual antenna phase elements are commanded to achieve the desired pointing.

The steering method according to the invention may be augmented with additional spacecraft body and antenna pointing corrections to maximize LMSS signal strength to the coverage region as the spacecraft position in orbit changes. Furthermore, the coverage pattern can be enlarged or decreased to compensate for the effects of changes in spacecraft altitude. Additionally, although the steering of antennas has been described above using mechanical steering, other methods, such as electrical steering using a phased array antenna, are also contemplated by the present invention. All of these enhancements are possible without departing from the spirit and scope of the invention.

In one aspect of the disclosure, a spacecraft operable in an inclined orbit with respect to Earth's equator comprises: at least one solar array rotatable about a pitch axis of the spacecraft; a receive antenna; a transmit antenna comprising an antenna attitude adjuster; at least one radiator panel; a spacecraft attitude adjustor; and a logic module comprising instructions to determine an angle θ for offsetting an attitude of the spacecraft by the angle θ with respect to a pitch axis of the nominal orientation, to determine an angle $\phi_b$ for offsetting the attitude of the spacecraft by the angle $\phi_b$ with respect to a roll axis of the spacecraft, and to determine a roll angle $\phi_a$ for offsetting the receive antenna and the transmit antenna at the roll angle $\phi_a$ with respect to the spacecraft, wherein a roll rotation angle $\phi$ is a combination of the angle $\phi_b$ and the roll angle $\phi_a$, wherein the spacecraft is configured such that the spacecraft has a nominal orientation in which a yaw axis of the spacecraft, the roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward a coverage region on Earth's surface, by offsetting the attitude of the spacecraft by the angle θ with respect to the pitch axis of the nominal orientation and by the angle $\phi_b$ with respect to the roll axis of the spacecraft, and by offsetting the receive antenna and the transmit antenna at the roll angle $\phi_a$ with respect to the spacecraft.

In one aspect, the angle $\phi_{nom}$ is based upon orbit parameters, orbital region of broadcast service, and/or the coverage region.

In one aspect, the angle $\phi_b$ and/or the roll angle $\phi_a$ are determined based upon maximum allowable sun angle, or roll offset from the nominal orientation.

In one aspect, the coverage region is North America.

In one aspect of the disclosure, a spacecraft operable in an inclined orbit with respect to Earth's equator, comprises: at least one solar array rotatable about a pitch axis of the spacecraft; a receive antenna; a transmit antenna comprising an antenna attitude adjuster; at least one radiator panel; a spacecraft attitude adjustor; and a logic module comprising instructions to determine a commanded attitude expressed by:

$$T_c = T_\phi T_\theta T_{ENP},$$

wherein $T_\phi$ is a roll correction matrix, $T_\theta$ is a pitch correction matrix, and $T_{ENP}$ is expressed by:

$$T_{ENP} = [X_i \, Y_i \, Z_i],$$

wherein $Z_i$ is Earth's polar axis vector, and vectors $X_i$ and $Y_i$ are expressed by:

$$Y_i = \frac{Z_i \times N}{\|Z_i \times N\|}$$

$$X_i = \frac{Y_i \times Z_i}{\|Y_i \times Z_i\|},$$

wherein N is a vector from the spacecraft to Earth's center, wherein $T_\phi$ and $T_\theta$ are expressed by:

$$T_\phi = \begin{bmatrix} \cos\phi & 0 & -\sin\phi \\ 0 & 1 & 0 \\ \sin\phi & & \cos\phi \end{bmatrix}$$

-continued $$T_\theta = \begin{bmatrix} \cos\theta & \sin\theta & 0 \\ -\sin\theta & \cos\theta & 0 \\ 0 & 0 & 1 \end{bmatrix},$$

wherein angles θ and φ are expressed by:

$$\theta = \tan^{-1}\left(\frac{Y_i \cdot V_t}{X_i \cdot V_t}\right)$$

$$\phi = -\sin^{-1}(Z_i \cdot V_t),$$

wherein $V_i$ is a unit vector from the spacecraft to a location within a coverage region on Earth's surface, wherein the spacecraft is configured such that the spacecraft has a nominal orientation in which a yaw axis of the spacecraft, a roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward the coverage region on Earth's surface, by offsetting an attitude of the spacecraft by angle θ with respect to a pitch axis of the nominal orientation and by angle $\phi_b$ with respect to the roll axis of the spacecraft, and by offsetting the receive antenna and the transmit antenna at a roll angle $\phi_a$ with respect to the spacecraft, wherein the receive antenna and the transmit antenna are configured to track the commanded attitude.

In one aspect of the disclosure, a spacecraft operable in an inclined orbit with respect to Earth's equator, comprises: at least one solar array rotatable about a pitch axis of the spacecraft; a receive antenna; a transmit antenna comprising an antenna attitude adjuster; at least one radiator panel; a spacecraft attitude adjustor; and a logic module comprising instructions to determine an angle $\theta_b$ for offsetting an attitude of the spacecraft by the angle θ with respect to a pitch axis of the nominal orientation, to determine an angle $\phi_b$ for offsetting the attitude of the spacecraft by the angle $\phi_b$ with respect to a roll axis of the spacecraft, and to determine a roll angle $\phi_a$ for offsetting the receive antenna and the transmit antenna at the roll angle $\phi_a$ with respect to the spacecraft, wherein angle φ is expressed by:

$$\phi = \phi_b + \phi_a,$$

wherein $\phi_b$ and $\phi_a$ are expressed by:

$$\phi_a = c(\phi - \phi_{nom}) + \phi_{nom} \quad \phi_b = (1-c)(\phi - \phi_{nom}),$$

wherein c and $\phi_{nom}$ are expressed by:

$$c = \frac{\Delta\phi_{scan}}{\Delta\phi}$$

$$\Delta\phi = \frac{\phi_{max} - \phi_{min}}{2},$$

$$\phi_{nom} = \frac{\phi_{max} + \phi_{min}}{2},$$

wherein $\Delta\phi_{scan}$ is a maximum antenna scan angle, $\phi_{max}$ is a maximum roll offset from the nominal orientation over at least a portion of the orbit, and $\phi_{min}$ is a minimum roll offset from the nominal orientation over at least a portion of the orbit, wherein the spacecraft is configured such that the spacecraft has a nominal orientation in which a yaw axis of the spacecraft, the roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward a coverage region on Earth's surface, by offsetting the attitude of the spacecraft by the angle θ with respect to the pitch axis of the nominal orientation and by the angle $\phi_b$ with respect to the roll axis of the spacecraft, and by offsetting the receive antenna and the transmit antenna at the roll angle $\phi_a$ with respect to the spacecraft.

In one aspect, the orbit has a semi-major axis of 42,164 km and an argument of perigee of 270°, and wherein $\phi_{nom}$ is 19.2°, Δφ is 29.0°, a maximum body roll offset is 14.0°, and a maximum pitch angle is 3.2°.

In one aspect, the orbit has a semi-major axis of 42,164 km and an argument of perigee of 270°, and wherein $\phi_{nom}$ is 25.5°, Δφ is 19.8°, a maximum body roll offset is 4.8°, and a maximum pitch angle is 4.8°.

In one aspect, the orbit has a semi-major axis of 42,164 km and an argument of perigee of 270°, and wherein $\phi_{nom}$ is 28.7°, Δφ is 30.2°, a maximum body roll offset is 15.2°, and a maximum pitch angle is 3.0°.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A spacecraft operable in an inclined orbit with respect to Earth's equator, comprising:
    at least one solar array rotatable about a pitch axis of the spacecraft;
    a receive antenna;
    a transmit antenna comprising an antenna attitude adjuster;
    at least one radiator panel;
    a spacecraft attitude adjustor; and
    a logic module comprising instructions to determine an angle θ for offsetting an attitude of the spacecraft by the angle θ with respect to a pitch axis of the nominal orientation, to determine an angle $\phi_b$ for offsetting the attitude of the spacecraft by the angle $\phi_b$ with respect to a roll axis of the spacecraft, and to determine a roll angle $\phi_a$ for offsetting the receive antenna and the transmit antenna at the roll angle $\phi_a$ with respect to the spacecraft, wherein a roll rotation angle φ is a combination of the angle $\phi_b$ and the roll angle $\phi_a$, wherein the spacecraft is configured such that the spacecraft has a nominal orientation in which a yaw axis of the spacecraft, the roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward a coverage region on Earth's surface, by offsetting the attitude of the spacecraft by the angle $\theta$ with respect to the pitch axis of the nominal orientation and by the angle $\phi_b$ with respect to the roll axis of the spacecraft, and by offsetting the receive antenna and the transmit antenna at the roll angle $\phi_a$ with respect to the spacecraft.

2. The spacecraft according to claim 1, wherein the angle $\phi_{nom}$ is based upon orbit parameters, orbital region of broadcast service, and/or the coverage region.

3. The spacecraft according to claim 1, wherein the angle $\phi_b$ and/or the roll angle $\phi_a$ are determined based upon maximum allowable sun angle, or roll offset from the nominal orientation.

4. The spacecraft according to claim 1, wherein the coverage region is North America.

5. A spacecraft operable in an inclined orbit with respect to Earth's equator, comprising:
   at least one solar array rotatable about a pitch axis of the spacecraft;
   a receive antenna;
   a transmit antenna comprising an antenna attitude adjuster;
   at least one radiator panel;
   a spacecraft attitude adjustor; and
   a logic module comprising instructions to determine a commanded attitude expressed by:

$$T_c = T_\phi T_\theta T_{ENP},$$

wherein $T_\phi$ is a roll correction matrix, $T_\theta$ is a pitch correction matrix, and $T_{ENP}$ is expressed by:

$$T_{ENP} = [X_i Y_i Z_i],$$

wherein $Z_i$ is Earth's polar axis vector, and vectors $X_i$ and $Y_i$ are expressed by:

$$Y_i = \frac{Z_i \times N}{\|Z_i \times N\|}$$

$$X_i = \frac{Y_i \times Z_i}{\|Y_i \times Z_i\|},$$

wherein N is a vector from the spacecraft to Earth's center, wherein $T_\phi$ and $T_\theta$ are expressed by:

$$T_\phi = \begin{bmatrix} \cos\phi & 0 & -\sin\phi \\ 0 & 1 & 0 \\ \sin\phi & 0 & \cos\phi \end{bmatrix}$$

$$T_\theta = \begin{bmatrix} \cos\theta & \sin\theta & 0 \\ -\sin\theta & \cos\theta & 0 \\ 0 & 0 & 1 \end{bmatrix},$$

wherein angles $\theta$ and $\phi$ are expressed by:

$$\theta = \tan^{-1}\left(\frac{Y_i \cdot V_t}{X_i \cdot V_t}\right)$$

$$\phi = -\sin^{-1}(Z_i \cdot V_t),$$

wherein $V_t$ is a unit vector from the spacecraft to a location within a coverage region on Earth's surface, wherein the spacecraft is configured such that the spacecraft has a nominal orientation in which a yaw axis of the spacecraft, a roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward the coverage region on Earth's surface, by offsetting an attitude of the spacecraft by angle $\theta$ with respect to a pitch axis of the nominal orientation and by angle $\phi_b$ with respect to the roll axis of the spacecraft, and by offsetting the receive antenna and the transmit antenna at a roll angle $\phi_a$ with respect to the spacecraft, wherein the receive antenna and the transmit antenna are configured to track the commanded attitude.

6. A spacecraft operable in an inclined orbit with respect to Earth's equator, comprising:
   at least one solar array rotatable about a pitch axis of the spacecraft;
   a receive antenna;
   a transmit antenna comprising an antenna attitude adjuster;
   at least one radiator panel;
   a spacecraft attitude adjustor; and
   a logic module comprising instructions to determine an angle $\theta$ for offsetting an attitude of the spacecraft by the angle $\theta$ with respect to a pitch axis of the nominal orientation, to determine an angle $\phi_b$ for offsetting the attitude of the spacecraft by the angle $\phi_b$ with respect to a roll axis of the spacecraft, and to determine a roll angle $\phi_a$ for offsetting the receive antenna and the transmit antenna at the roll angle $\phi_a$ with respect to the spacecraft, wherein angle $\phi$ is expressed by:

$$\phi = \phi_b + \phi_a,$$

wherein $\phi_b$ and $\phi_a$ are expressed by:

$$\phi_a = c(\phi - \phi_{nom}) + \phi_{nom} \quad \phi_b = (1-c)(\phi - \phi_{nom}),$$

wherein c and $\phi_{nom}$ are expressed by:

$$c = \frac{\Delta\phi_{scan}}{\Delta\phi}$$

$$\Delta\phi = \frac{\phi_{max} - \phi_{min}}{2},$$

$$\phi_{nom} = \frac{\phi_{max} + \phi_{min}}{2},$$

wherein $\Delta\phi_{scan}$ is a maximum antenna scan angle, $\phi_{max}$ is a maximum roll offset from the nominal orientation over at least a portion of the orbit, and $\phi_{min}$ is a minimum roll offset from the nominal orientation over at least a portion of the orbit, wherein the spacecraft is configured such that the spacecraft has a nominal orientation in which a yaw axis of the spacecraft, the roll axis of the spacecraft, and the at least one radiator panel are substantially parallel to Earth's equatorial plane, in which the pitch axis of the spacecraft is substantially parallel to Earth's polar axis, in which the Nadir vector is in a yaw-pitch plane of the spacecraft, and in which the transmit antenna and receive antenna are oriented at angle $\phi_{nom}$, wherein the antenna attitude adjustor and the spacecraft attitude adjustor are configured to correct an attitude of the transmit antenna to maintain a desired degree of the receive antenna and the transmit antenna steered toward a coverage region on Earth's surface, by offsetting the attitude of the spacecraft by the angle $\theta$ with respect to the pitch axis of the nominal orientation and by the angle $\phi_b$ with respect to the roll axis of the spacecraft, and by offsetting the receive antenna and the transmit antenna at the roll angle $\phi_a$ with respect to the spacecraft.

7. The spacecraft according to claim 6, wherein the orbit has a semi-major axis of 42,164 km and an argument of perigee of 270°, and wherein $\phi_{nom}$ is 19.2°, $\Delta\phi$ is 29.0°, a maximum body roll offset is 14.0°, and a maximum pitch angle is 3.2°.

8. The spacecraft according to claim 6, wherein the orbit has a semi-major axis of 42,164 km and an argument of perigee of 270°, and wherein $\phi_{nom}$ is 25.5°, $\Delta\phi$ is 19.8°, a maximum body roll offset is 4.8°, and a maximum pitch angle is 4.8°.

9. The spacecraft according to claim 6, wherein the orbit has a semi-major axis of 42,164 km and an argument of perigee of 270°, and wherein $\phi_{nom}$ is 28.7°, $\Delta\phi$ is 30.2°, a maximum body roll offset is 15.2°, and a maximum pitch angle is 3.0°.

* * * * *

UNITED STATES PATENT AND TRADEMARK OFFICE
CERTIFICATE OF CORRECTION

PATENT NO. : 7,832,688 B2
APPLICATION NO. : 12/559246
DATED : November 16, 2010
INVENTOR(S) : Neil Evan Goodzeit It is certified that error appears in the above-identified patent and that said Letters Patent is hereby corrected as shown below:

In Column 9, Line 29:   Replace "$T_{74_b} T_{74} T_{ENP}$", with -- $T_{\theta_b} T_\theta T_{ENP}$ --.

In Column 9, Line 39:   Replace "$T_{\phi_c}$", with -- $T_{\phi_a}$ --.

Signed and Sealed this
Twenty-third Day of August, 2011

David J. Kappos
*Director of the United States Patent and Trademark Office*